US 11,997,520 B2

(12) United States Patent
Zhang et al.

(10) Patent No.: US 11,997,520 B2
(45) Date of Patent: May 28, 2024

(54) DOWNLINK CHANNEL QUALITY REPORTING IN CONNECTED MODE

(71) Applicant: Telefonaktiebolaget LM Ericsson (publ), Stockholm (SE)

(72) Inventors: Johan Zhang, Solna (SE); Andreas Höglund, Solna (SE); Olof Liberg, Enskede (SE); Ritesh Shreevastav, Upplands Väsby (SE); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 559 days.

(21) Appl. No.: 17/283,895

(22) PCT Filed: Oct. 8, 2019

(86) PCT No.: PCT/EP2019/077187
§ 371 (c)(1),
(2) Date: Apr. 8, 2021

(87) PCT Pub. No.: WO2020/074491
PCT Pub. Date: Apr. 16, 2020

(65) Prior Publication Data
US 2021/0360459 A1 Nov. 18, 2021

Related U.S. Application Data

(60) Provisional application No. 62/742,666, filed on Oct. 8, 2018.

(51) Int. Cl.
*H04W 24/10* (2009.01)
*H04W 72/21* (2023.01)
(Continued)

(52) U.S. Cl.
CPC ............ *H04W 24/10* (2013.01); *H04W 72/21* (2023.01); *H04W 72/23* (2023.01); *H04W 76/10* (2018.02);
(Continued)

(58) Field of Classification Search
CPC ..... H04W 24/10; H04W 72/21; H04W 72/23; H04W 76/27; H04W 76/10; H04W 76/19; H04W 80/02; Y02D 30/70
See application file for complete search history.

(56) References Cited

U.S. PATENT DOCUMENTS

2013/0051349 A1 2/2013 Lv et al.
2016/0192433 A1* 6/2016 Deenoo ................. H04W 24/08
370/329
(Continued)

FOREIGN PATENT DOCUMENTS

WO 2018031928 A1 2/2018

OTHER PUBLICATIONS

International Search Report and Written Opinion dated Dec. 5, 2019 for International Application No. PCT/EP2019/077187 filed Dec. 21, 2018, consisting of 14-pages.
(Continued)

*Primary Examiner* — Michael K Phillips
(74) *Attorney, Agent, or Firm* — Weisberg I.P. Law, P.A.

(57) ABSTRACT

A method, system and apparatus are disclosed. A network node and a wireless device configured to communicate in a communication system are provided. The communication system having narrowband multi-carrier operation. The network node including processing circuitry configured to receive in an uplink control information field an indication of a downlink channel quality for at least one of a plurality of carriers used by the wireless device in a radio resource control, RRC, connected mode. The wireless device includ-
(Continued)

ing processing circuitry configured to trigger an indication of a downlink channel quality in an uplink control information field and cause transmission of the indication to a network node.

20 Claims, 8 Drawing Sheets

(51) Int. Cl.
  *H04W 72/23* (2023.01)
  *H04W 76/10* (2018.01)
  *H04W 76/19* (2018.01)
  *H04W 76/27* (2018.01)
  *H04W 80/02* (2009.01)

(52) U.S. Cl.
  CPC ............ *H04W 76/19* (2018.02); *H04W 76/27* (2018.02); *H04W 80/02* (2013.01)

(56) References Cited

U.S. PATENT DOCUMENTS

| | | | |
|---|---|---|---|
| 2017/0196022 A1 | 7/2017 | Yi et al. | |
| 2019/0208429 A1* | 7/2019 | Hong | H04L 5/001 |
| 2021/0168895 A1* | 6/2021 | Sha | H04W 72/23 |

OTHER PUBLICATIONS

3GPP TSG-RAN WG1 Meeting #94bis Tdoc R1-1811590; Title: Support of DL quality report in connected mode in NB-IoT; Agenda Item: 6.2.2.7; Source: Ericsson; Document for: Discussion; Date and Location: Oct. 8-12, 2018, Chengdu, China, consisting of 4-pages.

3GPP TSG-RNA WG4 Meeting #88 R4-1810139; Title: Introduction of MSG3-based channel quality report for NB-IoT; SOurce to WG: Ericsson; Source to TSG: R4; Work Item Code: NB_IOTenh-Core; Date and Location: Aug. 20-24, 2018, Göteborg, Sweden, consisting of 3-pages.

3GPP TSG-RAN WG1 Meeting #92 R1-1802031; Title: Discussion on DL CE Level Determination Issue in NB-IoT; Agenda Item: 6.1.6; Source: CMCC; Document for: Discussion and Decision; Date and Location: Feb. 26-Mar. 2, 2018, Athens, Greece, consisting of 5-pages.

3GPP TSG-RAN WG1 Meeting #92bis R1-1804087; Title: Discussion on DL CE Level Determination Issue in NB-IoT; Agenda Item: 6.1.6; Source: CMCC; Document for: Discussion and Decision; Date and Location: Apr. 16-20, 2018, Sanya, China, consisting of 4-pages.

3GPP TSG RAN Meeting #80 RP-181451; Title: New WID on Rel-16 enhancements for NB-IoT; Agenda Item: 10.1.3; Source: Ericsson, Huawei; Document for: Approval; Date and Location: Jun. 11-14, 2018, La Jolla, USA, consisting of 4-pages.

3GPP TSG-RAN WG1 Meeting #94bis Tdoc R1-1810198; Title: Support of quality report in Msg3 for non-anchor access in NB-IoT; Agenda Item: 6.2.2.5; Source: Ericsson; Document for: Discussion and Decision; Date and Location: Oct. 8-12, 2018, Chengdu, China, consisting of 4-pages.

3GPP TSG-RAN WG1 Meeting #92bis R1-1804168; Title: Remaining Issues on DL measurement reporting in NB-IoT; Agenda Item: 6.1.6; Source: Ericsson; Document for: Discussion and Decision; Date and Location: Feb. 16-Apr. 20, 2018, Sanya, China, consisting of 4-pages.

3GPP TSG-RAN WG2 Meeting #102 R1-1807869 revision of R2-1805076; Title: Introduction of DL channel quality reporting in MSG3; Agenda Item: 8.11.2; Source: Huawei, HiSilicon; Document for: Discussion and decision; Date and Location: May 21-25, 2018, Busan, Korea, consisting of 10-pages.

3GPP TSG RAN WG1 Meeting #94 R1-1808443; Title: Support of Quality report in Msg3 for non-anchor access; Agenda Item: 6.2.2.5; Source: Nokia, Nokia Shanghai Bell; Document for: Discussion and Decision; Date and Location: Aug. 20-24, 2018, Gothenburg, Sweden, consisting of 2-pages.

3GPP TS 36.133 V15.4.0; 3rd Generation Partnership Project; Technical Specification Group Radio Access Network; Evolved Universal Terrestrial Radio Access (E-UTRA); Requirements for support of radio resource management (Release 15); Sep. 2018, consisting of 3227-pages.

* cited by examiner

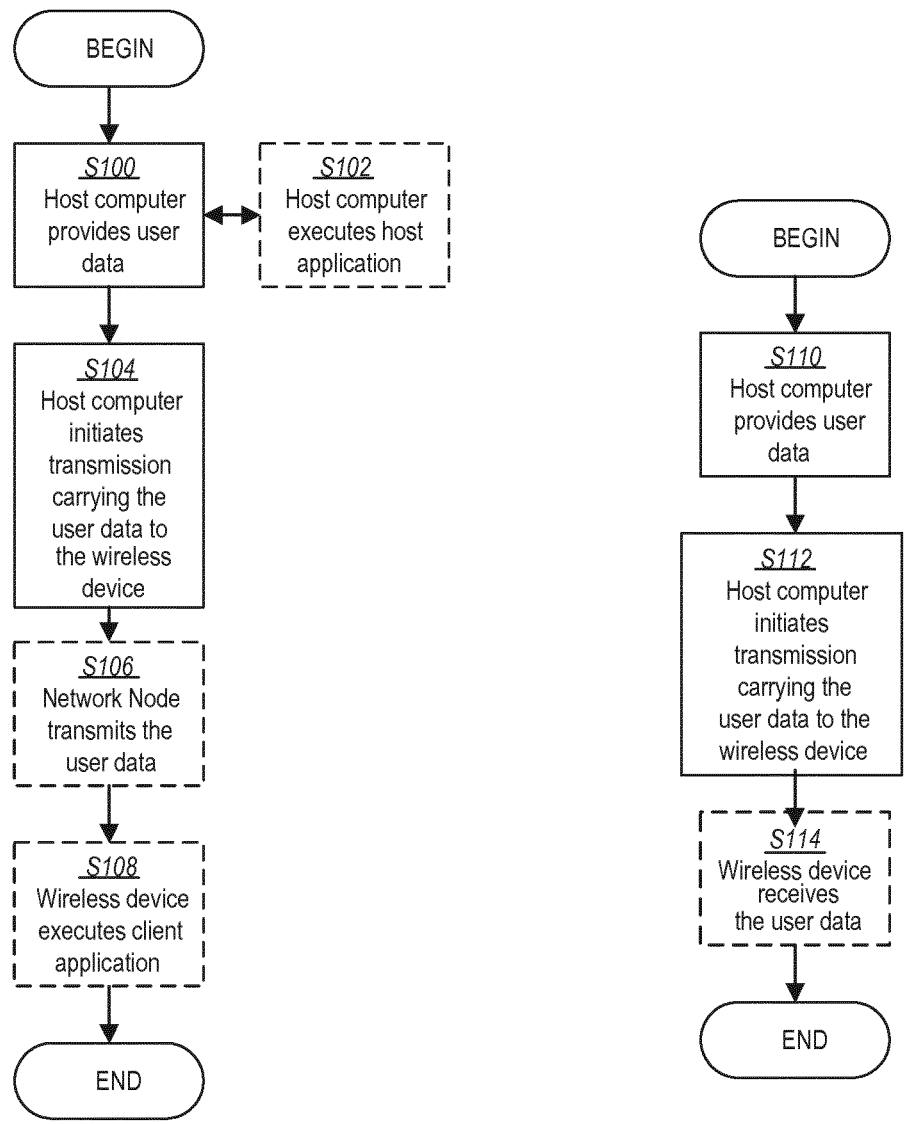

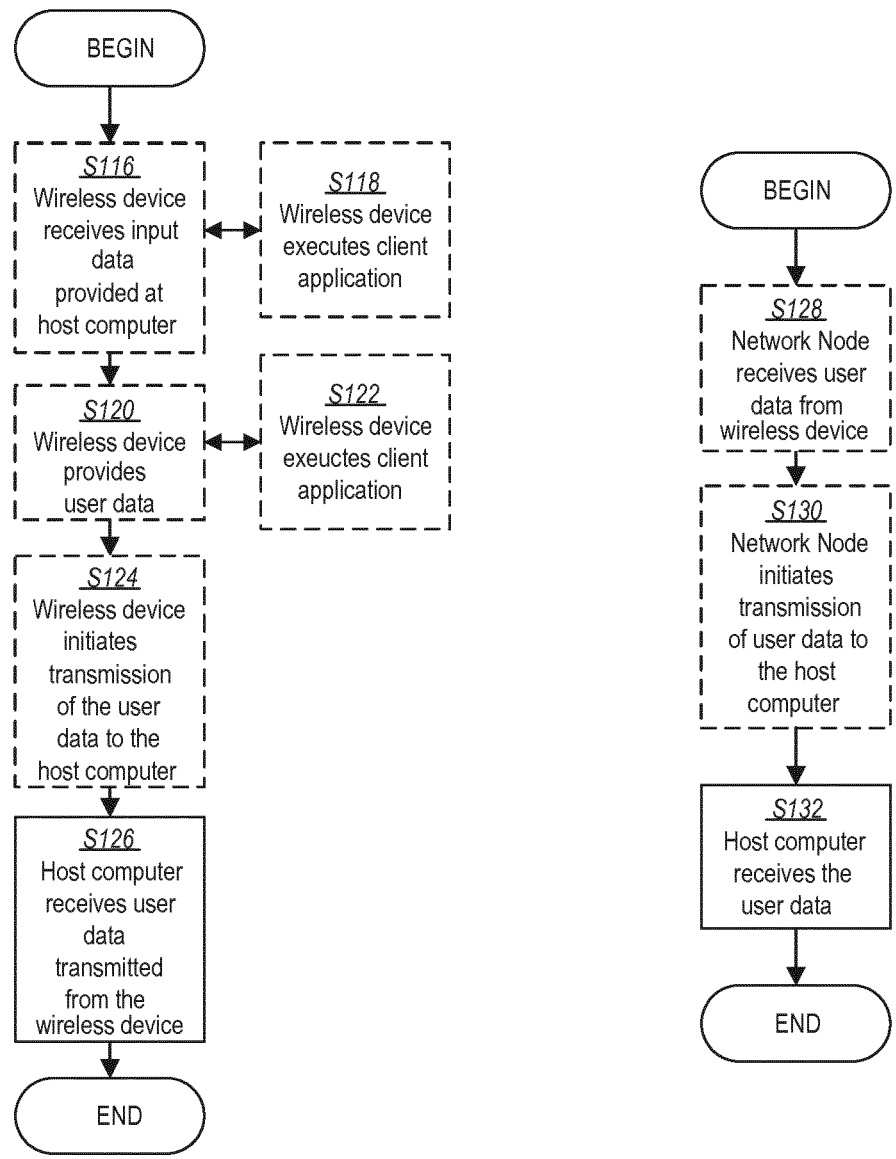

US 11,997,520 B2

DOWNLINK CHANNEL QUALITY REPORTING IN CONNECTED MODE

CROSS-REFERENCE TO RELATED APPLICATIONS

This application is a Submission Under 35 U.S.C. § 371 for U.S. National Stage Patent Application of International Application No.: PCT/EP2019/077187, filed Oct. 8, 2019 entitled "DOWNLINK CHANNEL QUALITY REPORTING IN CONNECTED MODE," which claims priority to U.S. Provisional Application No. 62/742,666, filed Oct. 8, 2018, entitled "SIGNALING DESIGN OF NB-IOT DL CHANNEL QUALITY REPORTING IN CONNECTED MODE," the entireties of both of which are incorporated herein by reference.

TECHNICAL FIELD

The present disclosure relates to wireless communications, and in particular, to reporting of downlink channel quality information.

BACKGROUND

In third generation partnership project (3GPP) Release 13 (Rel 13), 3GPP developed narrowband-internet of things (NB-IoT) and long term evolution for machines (LTE-M). These radio access technologies provide connectivity to services and applications demanding qualities such as reliable indoor coverage and high capacity, in combination with low system complexity and optimized device power consumption.

To help support reliable coverage in the most extreme situations NB-IoT and/or LTE-M have the ability to perform link adaptation on physical channels by subframe bundling and repetitions. In the downlink (from the network node such as a gNB to the wireless device), link adaptation applies to the narrowband physical downlink control channel (NPDCCH) and Machine-Type Communications (MTC) physical downlink shared channel (MPDSCH). In the uplink (from the wireless device to the network node such as the gNB), link adaptation applies to the narrowband physical uplink shared channel (NPUSCH) and narrowband physical random access channel (NPRACH).

During the deployment of existing systems, it was identified that there is a lack of feedback of the downlink (DL) channel quality such that, in NB-IoT, the DL link adaptation in some cases tended to overestimate or underestimate the DL channel quality. This inaccurate estimation leads to wasted DL resources that may result from either unnecessary repetition of the DL transport block or DL transport block retransmission due to errors.

In order to try to address the issue of poor DL channel quality estimation, during the maintenance phase of 3GPP Release 14 (Rel 14) NB-IoT, support for message 3 (Msg3) quality reporting was introduced where channel quality reporting for an anchor carrier was suggested, and RAN2 (a standardization group) would subsequently introduce the corresponding signaling based on input from (a standardization group) RAN4, see for example the 3GPP technical specification (TS) 36.133 V15.4.0 (2018-09). Also, in 3GPP Rel 14 NB-IoT, multi-carrier operation in idle mode for paging and random access was introduced.

In a work item description (WID) of 3GPP Release 16 (Rel 16) enhancements for NB-IoT, objectives for future study for improving multi-carrier operation include:

Specify support of Msg3 quality reporting for non-anchor carrier access [radio access network 1 (RAN1) and RAN2 groups]; and Specify signaling to indicate on a non-anchor carrier for paging a set of subframes which may contain NRS even when no paging NPDCCH is transmitted [RAN1, RAN2 and RAN4 groups].

In other words, support for DL channel quality reporting is still not established.

SUMMARY

Some embodiments advantageously provide methods, systems, and apparatuses for reporting of a downlink channel quality information using in-band signaling.

The teachings of the instant disclose advantageously provide a signaling design to enable DL channel quality reporting for NB-IoT in connected mode, e.g., a wireless device in radio resource control (RRC) connected mode. This helps support for DL channel quality reporting in connected mode for NB-IoT.

According to one aspect of the disclosure, a network node is configured to communicate with a wireless device in a communication system where the communication system comprises narrowband multi-carrier operation. The network node comprising processing circuitry configured to: receive in an uplink control information field an indication of a downlink channel quality for at least one of a plurality of carriers used by the wireless device in a radio resource control, RRC, connected mode.

According to one or more embodiments of this aspect, the processing circuitry further configured to cause transmission of signaling including control information configured to trigger the reporting of the downlink channel quality. According to one or more embodiments of this aspect, the reporting of the downlink channel quality is comprised in a first Medium Access Control, MAC, control element, CE. According to one or more embodiments of this aspect, the control information configured to trigger the reporting of the downlink channel quality is comprised in a second Medium Access Control, MAC, control element, CE.

According to one or more embodiments of this aspect, the indication of the downlink channel quality is received using a shared channel that is used for control information and wireless device data. According to one or more embodiments of this aspect, the at least one of the plurality of carriers is at least one of a configured carrier and a configured set of downlink resources. According to one or more embodiments of this aspect, the configured carrier is a non-anchor carrier. According to one or more embodiments of this aspect, the downlink channel quality is reported in a Quality of Service, QoS, Class Identifier, QCI, report.

According to one or more embodiments of this aspect, the signaling including control information configured to trigger the reporting of the downlink channel quality is part of a random access procedure. According to one or more embodiments of this aspect, the indication of the downlink channel quality indicates a metric corresponding to downlink decoding performance at the wireless device. According to one or more embodiments of this aspect, the indication of the downlink channel quality indicates a number of repetitions of downlink control channel repetitions. According to one or more embodiments of this aspect, the signaling is further configured to cause the wireless device to enter the Radio Resource Control, RRC,_Connected mode or state. According to one or more embodiments of this aspect, the signaling is provided to the wireless device that is in the Radio Resource Control, RRC,_Connected state. According to one or more embodiments of this aspect, the processing circuitry is further configured to adjust resource allocation to the wireless device based at least in part on the indication of the downlink channel quality.

According to another aspect of the disclosure, a wireless device configured to communicate with a network node in a communication system is provided. The communication system comprises narrowband multi-carrier operation. The wireless device includes processing circuitry configured to: trigger an indication of a downlink channel quality, in an uplink control information field, for at least one of a plurality of carriers used by the wireless device in a radio resource control, RRC, connected mode; and cause transmission of the indication of the downlink channel quality.

According to one or more embodiments of this aspect, the processing circuitry is further configured to receive signaling including control information configured to trigger reporting of the downlink channel quality. According to one or more embodiments of this aspect, the reporting of the downlink channel quality is comprised in a first Medium Access Control, MAC, control element, CE. According to one or more embodiments of this aspect, the control information configured to trigger the reporting of the downlink channel quality is comprised in a second Medium Access Control, MAC, control element, CE.

According to one or more embodiments of this aspect, the indication of the downlink channel quality is transmitted using a shared channel that is used for control information and wireless device data. According to one or more embodiments of this aspect, the at least one of the plurality of carriers is at least one of a configured carrier and a configured set of downlink resource. According to one or more embodiments of this aspect, the at least one of the plurality of configured carriers is at least one of a plurality of non-anchor carriers. According to one or more embodiments of this aspect, the downlink channel quality is reported in a Quality of Service, QoS, Class Identifier, QCI, report.

According to one or more embodiments of this aspect, the signaling including control information configured to trigger the reporting of the downlink channel quality is part of a random access procedure. According to one or more embodiments of this aspect, the indication of the downlink channel quality indicates a metric corresponding to downlink decoding performance at the wireless device. According to one or more embodiments of this aspect, the indication of the downlink channel quality indicates a number of repetitions of downlink control channel repetitions. According to one or more embodiments of this aspect, the signaling is further configured to cause the wireless device to enter the Radio Resource Control, RRC,_Connected mode or state. According to one or more embodiments of this aspect, the signaling is provided to the wireless device that is in the Radio Resource Control, RRC,_Connected state.

According to another aspect of the disclosure, a method implemented by a network node configured to communicate with a wireless device in a communication system is provided. The communication system comprises narrowband multi-carrier operation. An indication of a downlink channel quality for at least one of a plurality of carriers used by the wireless device in the radio resource control, RRC, connected mode is received in an uplink control information field.

According to one or more embodiments of this aspect, transmission of signaling is caused where the signaling includes control information configured to trigger the reporting of the downlink channel quality. According to one or more embodiments of this aspect, the reporting of the downlink channel quality is comprised in a first Medium Access Control, MAC, control element, CE. According to one or more embodiments of this aspect, the control information configured to trigger the reporting of the downlink channel quality is comprised in a second Medium Access Control, MAC, control element, CE. According to one or more embodiments of this aspect, the indication of the downlink channel quality is received using a shared channel that is used for control information and wireless device data.

According to one or more embodiments of this aspect, the at least one of the plurality of carriers is at least one of a configured carrier and configured set of downlink resources. According to one or more embodiments of this aspect, the configured carrier is a non-anchor carrier. According to one or more embodiments of this aspect, the downlink channel quality is reported in a Quality of Service, QoS, Class Identifier, QCI, report. According to one or more embodiments of this aspect, the signaling including control information configured to trigger the reporting of the downlink channel quality is part of a random access procedure.

According to one or more embodiments of this aspect, the indication of the downlink channel quality indicates a metric corresponding to downlink decoding performance at the wireless device. According to one or more embodiments of this aspect, the indication of the downlink channel quality indicates a number of repetitions of downlink control channel repetitions. According to one or more embodiments of this aspect, the signaling is further configured to cause the wireless device to enter the Radio Resource Control, RRC,_Connected mode or state. According to one or more embodiments of this aspect, the signaling is provided to the wireless device that is in the Radio Resource Control, RRC,_Connected state. According to one or more embodiments of this aspect, the processing circuitry is further configured to adjust resource allocation to the wireless device based at least in part on the indication of the downlink channel quality.

According to another aspect of the disclosure, a method implemented by a wireless device configured to communicate with a network node in a communication system is provided. The communication system includes narrowband multi-carrier operation. An indication is triggered of a downlink channel quality, in an uplink control information field, for at least one of a plurality of carriers used by the wireless device in a radio resource control, RRC, connected mode. Transmission is caused of the indication of the downlink channel quality.

According to one or more embodiments of this aspect, signaling including control information configured to trigger reporting of the downlink channel quality is received. According to one or more embodiments of this aspect, the reporting of the downlink channel quality is comprised in a first Medium Access Control, MAC, control element, CE. According to one or more embodiments of this aspect, the control information configured to trigger the reporting of the downlink channel quality is comprised in a second Medium Access Control, MAC, control element, CE. According to one or more embodiments of this aspect, the indication of the downlink channel quality is transmitted using a shared channel that is used for control information and wireless device data.

According to one or more embodiments of this aspect, the at least one of the plurality of carriers is at least one of a configured carrier and configured set of downlink resources. According to one or more embodiments of this aspect, the configured carrier is a non-anchor carrier. According to one or more embodiments of this aspect, the downlink channel quality is reported in a Quality of Service, QoS, Class Identifier, QCI, report. According to one or more embodiments of this aspect, the signaling including control information configured to trigger the reporting of the downlink channel quality is part of a random access procedure.

According to one or more embodiments of this aspect, the indication of the downlink channel quality indicates a metric corresponding to downlink decoding performance at the wireless device. According to one or more embodiments of this aspect, the indication of the downlink channel quality indicates a number of repetitions of downlink control channel repetitions. According to one or more embodiments of this aspect, the signaling is further configured to cause the wireless device to enter Radio Resource Control, RRC, _Connected mode or state. According to one or more embodiments of this aspect, the signaling is provided to the wireless device that is in the Radio Resource Control, RRC,_Connected state.

According to another aspect of the disclosure, a computer readable medium comprising program instructions is provided. When the computer program instructions are executed by a processor, the processor is caused to perform any one of the methods, processes and/or functions described herein.

According to another aspect of the disclosure, a computer program is provided where the computer program includes program instructions configured to perform any one of the methods, processes and/or functions described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
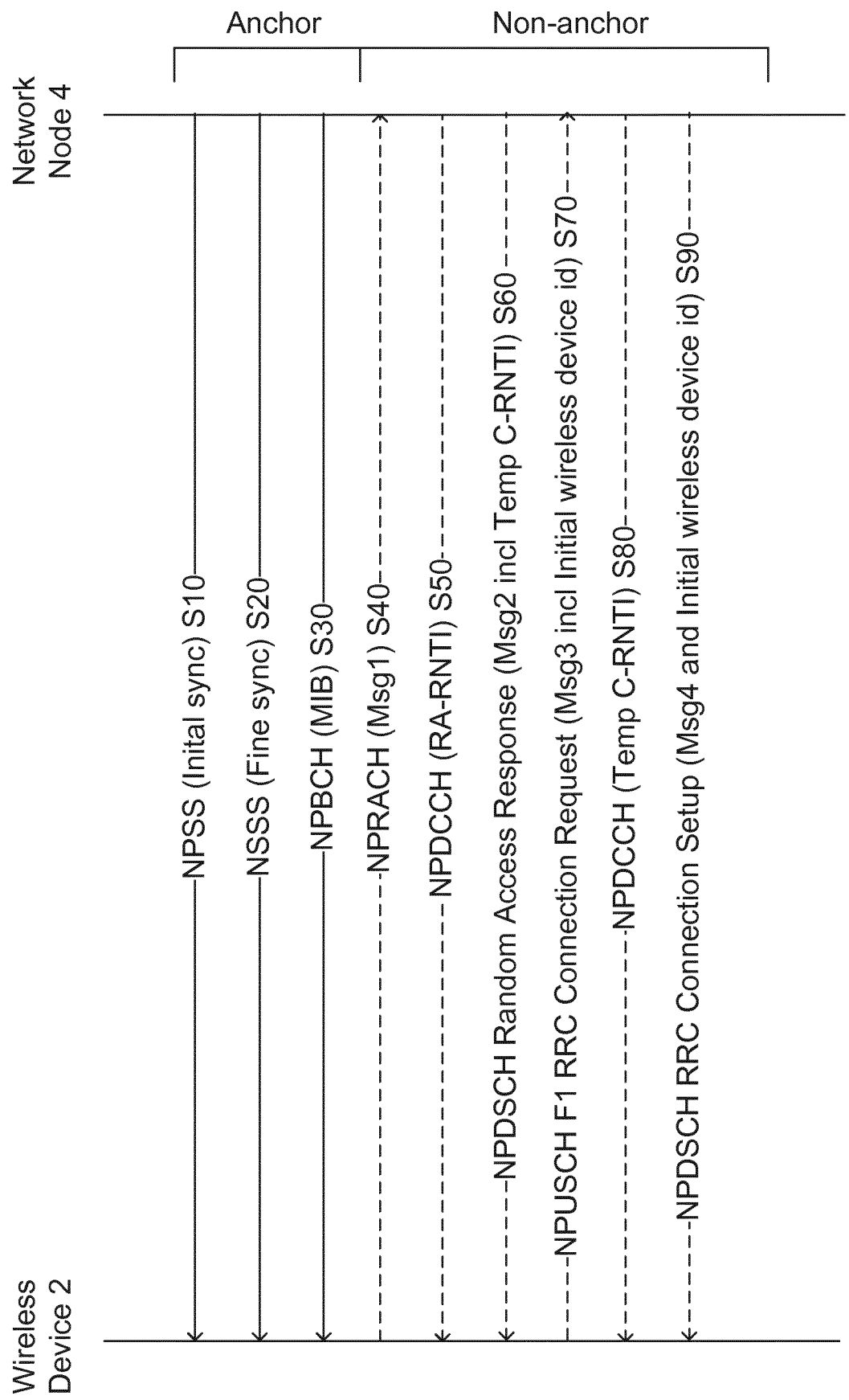
FIG. 1 is a signaling diagram of a random access procedure in NB-IoT.

Currently, 3GPP has discussed studying the DL channel quality when setting up the connecting of a wireless device, i.e., the wireless device reports the DL channel quality in Msg3 to the network node. Regarding the DL channel quality reporting on the non-anchor carrier, a working assumption during the 3GPP study was as follows:

For channel quality report in Msg3 on non-anchor carrier access, the wireless device performs the channel quality measurement on the carrier it monitors for Msg2 (i.e., RAR). For further study is whether the wireless device performs measurement on other carriers.

In the existing NB-IoT environment, it is possible that monitoring of the DL carrier, by the wireless device, for RAR may not be necessary as the DL carrier may be assigned to the wireless device in connected mode, due to, e.g., DL load balancing. Therefore, it may be beneficial for the wireless device to report the DL channel quality of a carrier indicated by the network/network node. However, such reporting of DL channel quality may come at a cost of higher wireless device complexity. Another possible solution is to allow the wireless device to report the DL channel quality in connected mode, and in the instant disclosure, the benefits of reporting the DL channel quality in connected mode are further described.

Both anchor and non-anchor DL channel quality reporting in Msg3 have been contemplated, but thus far only DL channel quality reporting for the anchor carrier has been introduced. In RAN4, for an anchor carrier, the NPDCCH repetition level for CQI-NPDCCH-NB and CQI-NPDCCH-Short-NB is chosen from the supported NPDCCH repetition levels. To be more specific, in the 3GPP technical specification (TS) 36.133 V15.4.0 (2018-09), a mapping for DL channel quality measurement reporting is provided, as illustrated in Table 1.

Message 3 (Msg3)-Based Measurement Report Mapping for Wireless Device 22 Category NB1:

TABLE 1

Downlink channel quality measurement report mapping of CQI-NPDCCH-NB when the DL channel quality reporting is supported

| Reported value | NPDCCH repetition level |
|---|---|
| noMeasurement | No measurement reporting |
| candidateRep-A | 1 |
| candidateRep-B | 2 |
| candidateRep-C | 4 |
| candidateRep-D | 8 |

TABLE 1-continued

Downlink channel quality measurement report mapping of CQI-NPDCCH-NB when the DL channel quality reporting is supported

| Reported value | NPDCCH repetition level |
|---|---|
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

TABLE 2

Downlink channel quality measurement report mapping of CQI-NPDCCH-Short-NB when the DL channel quality reporting is supported

| Reported value | NPDCCH repetition level |
|---|---|
| noMeasurements | No measurement reporting |
| candidateRep-1 | $R_{max}/[8]$ (Note 1) |
| candidateRep-2 | $R_{max}$ |
| candidateRep-3 | $[4] \times R_{max}$ (Note 2) |

(Note 1):
When $R_{max}$ is less than 8, set candidateRep-1 to 1.
(Note 2):
When $R_{max}$ is more than 512, set candidateRep-3 to 2048.

Figure 2:
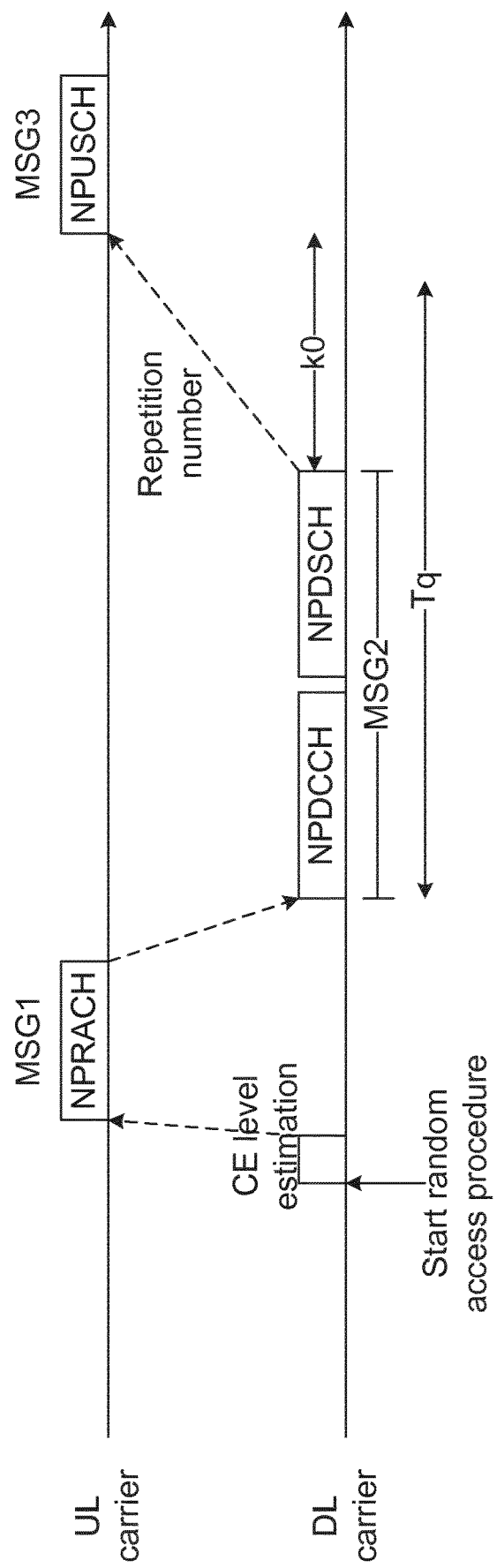
FIG. 2 is a diagram of a wireless device procedure for reporting channel quality in MSG3.

A random access procedure in NB-IoT is depicted in FIG. 1 and FIG. 2. In particular, FIG. 1 is a signaling diagram between wireless device 2 and network node 4. Network node 4 transmits (S10) narrowband synchronization signal (s) to wireless device 2 for initial synchronization (initial sync). Network node 4 transmits (S20) narrowband secondary synchronization signal(s) to wireless device 2 for fine synchronization (fine sync). Network node 4 transmits (S30), via a narrowband broadcast channel, master information block (MIB) to the wireless device 2. Wireless device 2 transmits (S40) message 1 (Msg1) via a narrowband physical random access channel (NPRACH). Network node 4 transmits (S50) rando access-radio network temporary identifier (RA-RNTI) to the wireless device 2.

Network node 4 transmits (S60) a random access response such as a message 2 including at temporary cell-RNTI (C-RNTI) via a narrowband physical downlink shared channel (NPDSCH). Wireless device 2 transmits (S70) a F1 radio resource control (RRC) connection request such as a message 3 (Msg3) including initial wireless device id via a narrowband physical uplink shared channel (NPUSCH) to network node 4. Network node 4 transmits (S80) temporary C-RNTI to the wireless device via a narrowband physical downlink control channel (NPDCCH). Network node 4 transmits (S90) a RRC connection setup message such as a message 4 (Msg4) and an initial wireless device id via the NPDSCH.

In 3GPP Rel-14 NB-IoT enhancement, a non-anchor carrier can be used for paging and random access. The carrier that the wireless device 2 monitors for the RAR message depends on which carrier the wireless device 2 chooses to send NPRACH where the NPRACH carrier is randomly chosen by the wireless device 2, and hence there is also a certain randomness when it comes to which DL carrier the wireless device 2 should monitor for the RAR message.

When setting up the connection, the network or network node 4 assigns a DL carrier in Msg4 for the wireless device 2 to use in connected mode. The DL carrier used in connected mode may be different from the one that the wireless device 2 monitors for the RAR message. For example, due to load balancing purposes, the network node 4 may move some wireless devices 2 to a different carrier in connected mode. In existing NB-IoT design, the moving of the wireless device 2 to a different carrier may only be achieved during RRC setup in Msg4, as both RRC reconfiguration and cross-carrier scheduling are not supported in NB-IoT.

While more RAR carriers may be set up to increase the cell capacity and keep the wireless device 2 on the carrier where the wireless device 2 receives the RAR message, such a design may be too restrictive. For example, in one RAR message, multiple wireless devices 2 can be addressed. This is an efficient way to reduce the resource usage in the DL when sending RAR messages as several wireless devices 2 from different NPRACH carriers can be addressed at the same time in one or more RAR messages (NB-IoT supports mapping several NPRACH carriers to one RAR carrier). Also, the wireless devices 2 can be distributed to other DL carriers for receiving DL data. In this case, some non-anchor carriers can be turned ON dynamically based on demand and only used for connected mode communication. This may be more efficient than turning ON/off the RAR carriers, which requires system information (SI) updates and can potentially take a long time.

It may be difficult for the wireless device 2 to monitor RAR on one carrier let alone to report the channel quality of the anchor carrier. In addition, currently, in idle mode, the wireless device 2 may only be required to measure the quality on the anchor carrier. Hence, if the wireless device 2 reports the DL channel quality measured on one carrier which is different than the one used in its connected mode, the reporting may become useless. The NRSRP with carrier specific NRS-offset may not be sufficient since it does not capture interference and the link quality. Therefore, it may be beneficial for the wireless device 2 to be able to report the DL channel quality of the carrier that the wireless device 2 used in connected mode. Furthermore, the NB-IoT can support a more diversified wireless device 2 case, e.g., wireless device 2 with low to medium mobility. Therefore, the DL channel quality may change during the connection time. Hence, it may be beneficial for the wireless device 2 to report the DL quality based on the instructions from the network node 4. In this way, the wireless device 2 can further optimize the resource allocation to the wireless device 2.

Further, in existing LTE systems, both periodic and aperiodic channel state information (CSI) are supported. For NB-IoT, both periodic and aperiodic DL channel quality reporting may be supported, but the LTE mechanism may not be applicable to NB-IoT due to the limitations in NB-IoT. To be more specific, for periodic CQI reporting, CQI is transmitted periodically with a certain interval specified by a higher layer message (e.g., RRC Connection Reconfiguration, RRC Connection Setup). For LTE, the periodic CSI reporting is sent on a physical uplink control channel (PUCCH), but there is no PUCCH for NB-IoT. Therefore, the mechanism in LTE may not be directly applicable to NB-IoT.

For aperiodic CQI reporting, CQI is transmitted when triggered by a special DCI trigger (e.g., DCI0, RACH Response). However, the DCI size of NB-IoT is limited, and due to low wireless device 2 complexity, it may be difficult for an NB-IoT wireless device 2 to monitor two different DCI sizes at the same time. Therefore, new methods of configuring and triggering the aperiodic DL channel quality reporting may need to be defined for NB-IoT.

Therefore, it may be necessary to support DL channel quality reporting in connected mode for NB-IoT.

The teachings described herein advantageously provide signaling for DL channel quality reporting for NB-IoT in connected mode. The methods described herein consider the wireless device complexity of the NB-IoT by providing a low complexity process for the network to request that the wireless device report the DL channel quality in connected mode. In one or more embodiments, a signaling design of periodic and/or aperiodic DL channel quality reporting is described in detail.

Before describing in detail exemplary embodiments, it is noted that the embodiments reside primarily in combinations of apparatus components and processing steps related to reporting of a downlink channel quality information using in-band signaling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, integrated access backhaul (IAB) node, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

An indication generally may explicitly and/or implicitly indicate the information it represents and/or indicates. The implicit indication may, for example, be based on position and/or resource used for transmission. The explicit indication may, for example, be based on a parametrization with one or more parameters, and/or one or more index or indices, and/or one or more bit patterns representing the information. It may, in particular, be considered that control signaling as described herein, based on the utilized resource sequence, implicitly indicates the control signaling type.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Data may refer to any kind of data, in particular, any one of and/or any combination of control data or user data or payload data. Control information (which may also be referred to as control data) may refer to data controlling and/or scheduling and/or pertaining to the process of data transmission and/or the network or terminal operation.

The term "signaling" used herein may comprise any of: high-layer signaling (e.g., via Radio Resource Control (RRC) or the like), lower-layer signaling (e.g., via a physical control channel or a broadcast channel), or a combination thereof. The signaling may be implicit or explicit. The signaling may further be unicast, multicast or broadcast. The signaling may also be direct to another node or via a third node.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. wireless device) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. wireless device) may comprise configuring the wireless device to perform certain measurements on certain subframes or radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide reporting of a downlink channel quality information using in-band signaling. In one or more embodiments, "out-of-band" signaling may generally refer to a process for delivering control information through different channels and processing from the process used to deliver payload information and/or user data. The remainder may be referred to as "in-band" signaling. For example, in-band signaling, in one or more embodiments, may refer to the transmission of control information in a channel also used for the transmission of payload information or user data. In one or more embodiments, this channel is the NPUSCH.

Figure 3:
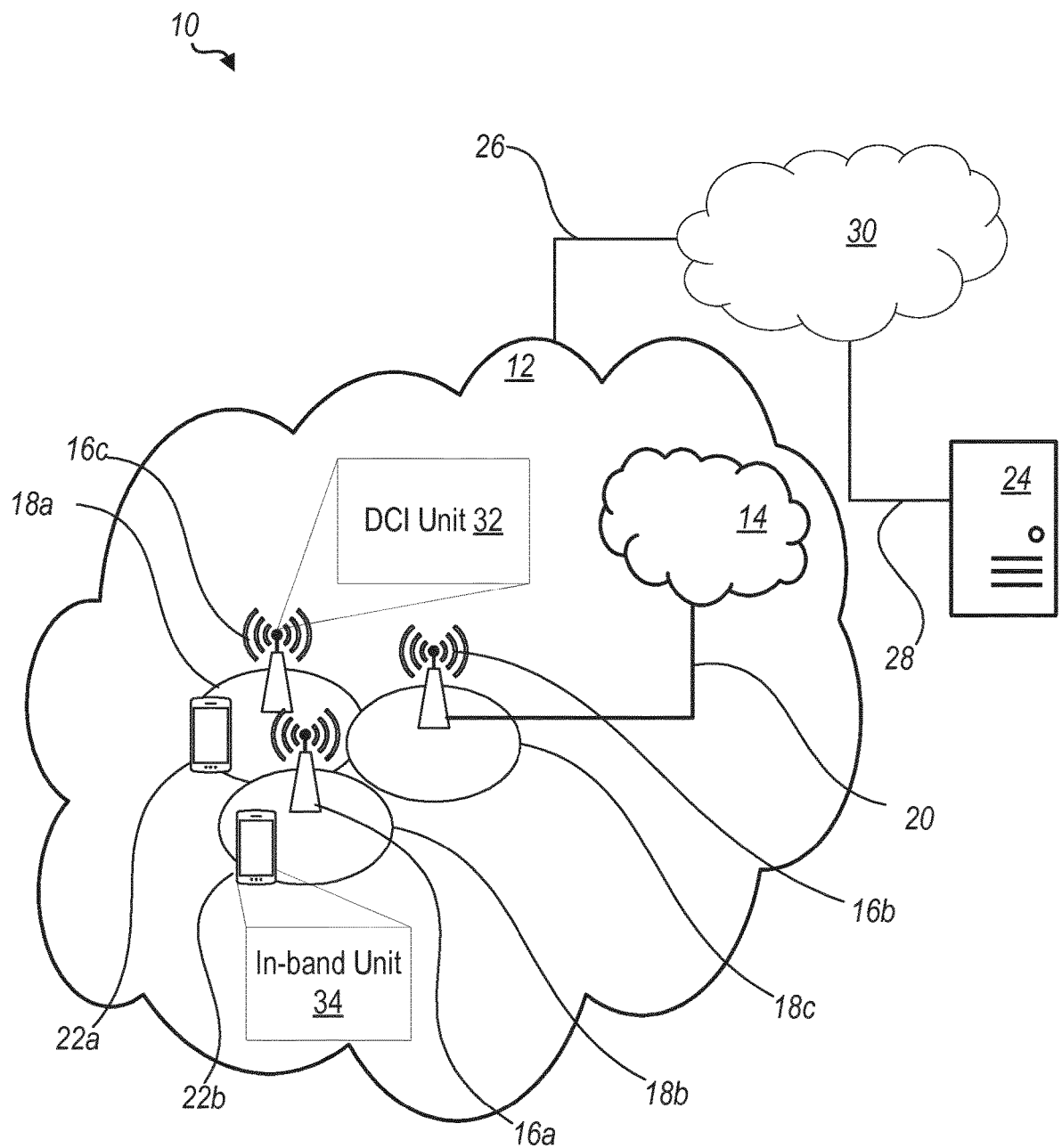
FIG. 3 is a schematic diagram of an exemplary network architecture illustrating a communication system connected via an intermediate network to a host computer according to the principles in the present disclosure.

Referring again to the drawing figures, in which like elements are referred to by like reference designators, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. In one or more embodiments, the communication system 10 provides support for narrowband multi-carrier operation. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of the routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a DCI unit 32 which is configured to cause reporting of a downlink channel quality information. A wireless device 22 is configured to include an in-band unit 34 which is configured to report of a downlink channel quality information using in-band signaling.

Example implementations, in accordance with an embodiment, of the wireless device 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to transmit and/or receive and/or process information related to reporting of a downlink channel quality information using in-band signaling.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by the network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include DCI unit 32 configured to cause reporting of a downlink channel quality information.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include an in-band unit 34 configured to report downlink channel quality information using in-band signaling.

Figure 4:
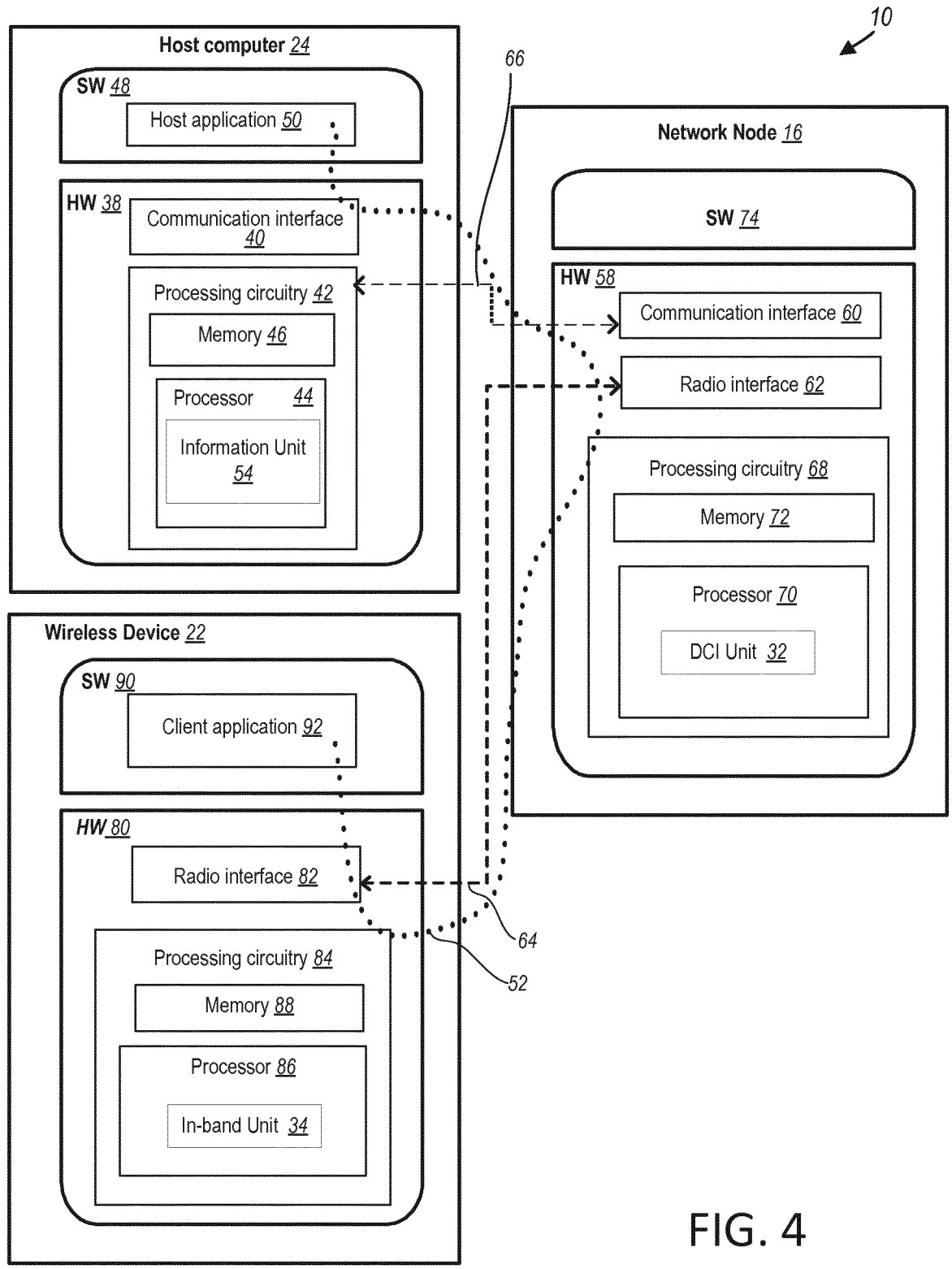
FIG. 4 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. The network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular, empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as DCI unit 32, and in-band unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a wireless device 22, which may be those described with reference to FIG. 4. In a first step of the method, the host computer 24 provides user data (Block S100). In an optional substep of the first step, the host computer 24 provides the user data by executing a host application, such as, for example, the host application 74 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 74 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In a first step of the method, the host computer 24 provides user data (Block S110). In an optional substep (not shown) the host computer 24 provides the user data by executing a host application, such as, for example, the host application 74. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, the client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
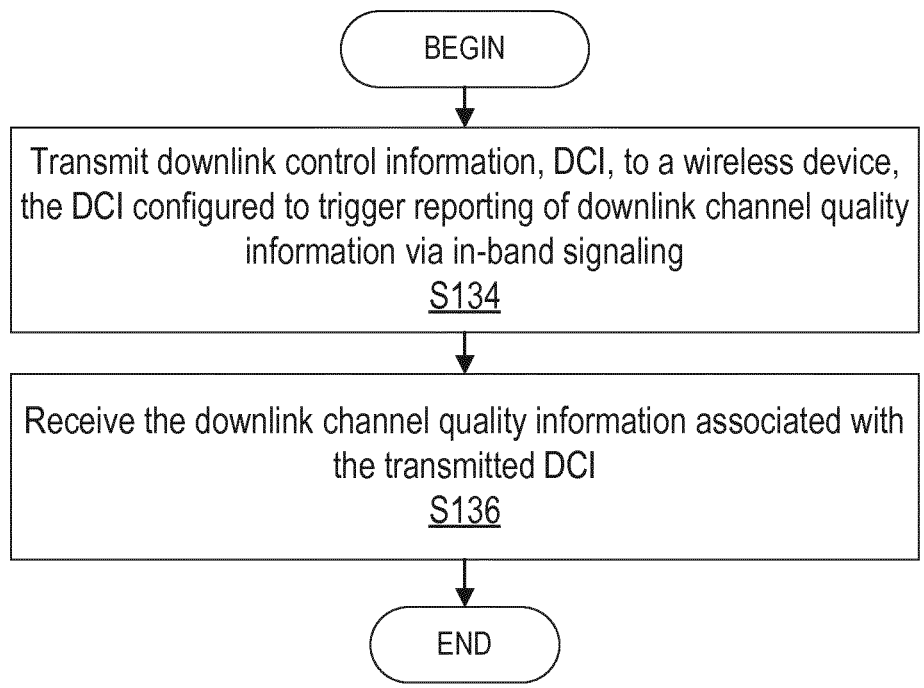
FIG. 9 is a flowchart of an exemplary process in a network node for causing reporting of a downlink channel quality information using in-band signaling according to some embodiments of the present disclosure.

FIG. 9 is a flowchart of an exemplary process in a network node 16 for causing reporting of a downlink channel quality information in accordance with the principles of the present disclosure. One or more Blocks described herein may be performed by one or more elements of network node 16 such as by one or more of processing circuitry 68 (including DCI unit 32), processor 70, radio interface 62 and/or communication interface 60. Network node 16 such as via processing circuitry 68 and/or processor 70 and/or radio interface 62 and/or communication interface 60 is configured to transmit (Block S134) downlink control information, DCI, to a wireless device 22 where the DCI is configured to trigger reporting of downlink channel quality information via in-band signaling. The network node 16 such as via processing circuitry 68 and/or processor 70 and/or radio interface 62 and/or communication interface 60 is configured to receive (Block S136) the downlink channel quality information associated with the transmitted DCI. In one or more embodiments, the downlink channel quality information may include data and/or information indicating one or more measurements and/or analysis of downlink channel quality at wireless device 22. In one or more embodiments, the wireless device 22 is in connected mode such as RRC connected mode.

According to one or more embodiments, the reporting of the downlink channel quality information occurs periodically if narrowband physical uplink shared channel, NPUSCH, resources are allocated to the wireless device 22 after the wireless device 22 performs measurements of the downlink channel quality. According to one or more embodiments, the reporting of the downlink channel quality information is aperiodic where the aperiodic reporting is triggered based in part on a format of the DCI.

Figure 10:
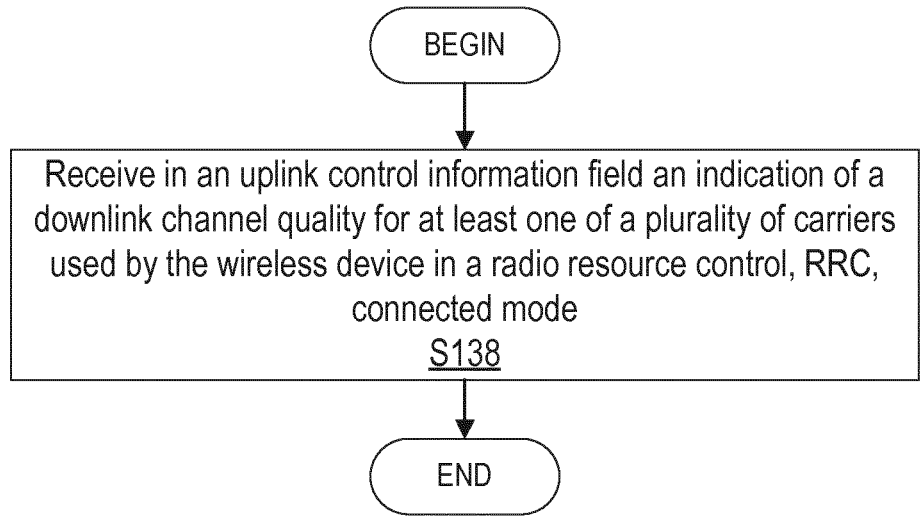
FIG. 10 is a flowchart of an exemplary process in a network node according to some embodiments of the present disclosure.

FIG. 10 is a flowchart of an exemplary process in a network node 16 in accordance with the principles of the present disclosure. One or more Blocks described herein may be performed by one or more elements of network node 16 such as by one or more of processing circuitry 68 (including DCI unit 32), processor 70, radio interface 62 and/or communication interface 60. Network node 16 such as via processing circuitry 68 and/or processor 70 and/or radio interface 62 and/or communication interface 60 is configured to receive (Block S138) in an uplink control information field an indication of a downlink channel quality for at least one of a plurality of carriers used by the wireless device 22 in a radio resource control, RRC, connected mode, as described herein.

According to one or more embodiments, the processing circuitry 68 further configured to cause transmission of signaling including control information configured to trigger the reporting of the downlink channel quality. According to one or more embodiments, the reporting of the downlink channel quality is comprised in a first Medium Access Control, MAC, control element, CE. According to one or more embodiments, the control information configured to trigger the reporting of the downlink channel quality is comprised in a second Medium Access Control, MAC, control element, CE.

According to one or more embodiments, the indication of the downlink channel quality is received using a shared channel that is used for control information and wireless device data. According to one or more embodiments, the at least one of the plurality of carriers is at least one of a configured carrier and configured set of downlink resources. According to one or more embodiments, the configured carrier is a non-anchor carrier. According to one or more embodiments, the downlink channel quality is reported in a Quality of Service, QoS, Class Identifier, QCI, report.

According to one or more embodiments, the signaling including control information configured to trigger the reporting of the downlink channel quality is part of a random access procedure. According to one or more embodiments, the indication of the downlink channel quality indicates a metric corresponding to downlink decoding performance at the wireless device. According to one or more embodiments, the indication of the downlink channel quality indicates a number of repetitions of downlink control channel repetitions. According to one or more embodiments, the signaling is further configured to cause the wireless device 22 to enter the Radio Resource Control, RRC,_Connected state. According to one or more embodiments, the signaling is provided to the wireless device 22 that is in the Radio Resource Control, RRC,_Connected state. According to one or more embodiments, the processing circuitry is further configured to adjust resource allocation to the wireless device 22 based at least in part on the indication of the downlink channel quality.

Figure 11:
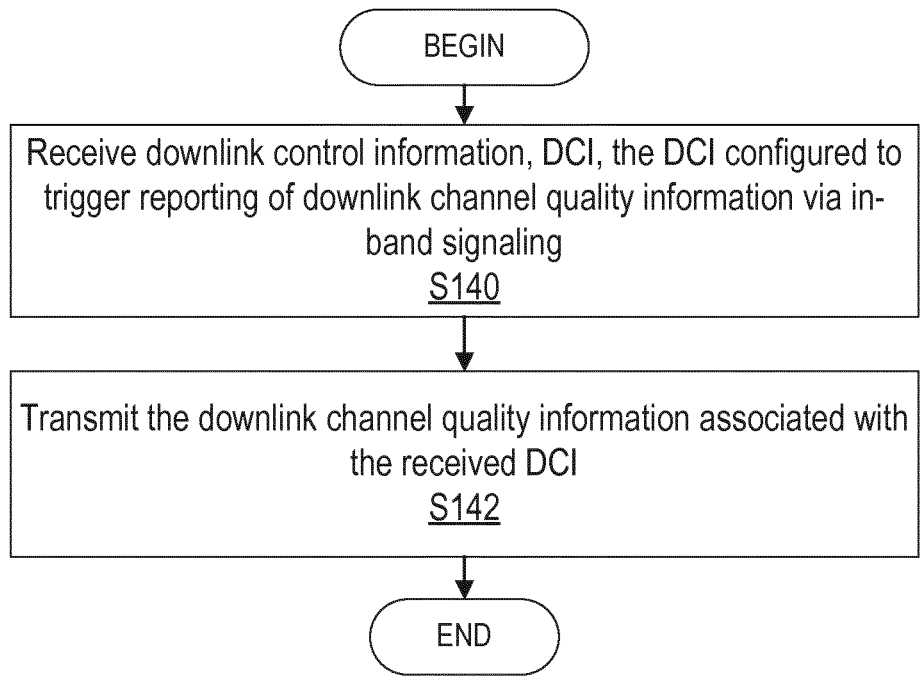
FIG. 11 is a flowchart of an exemplary process in a wireless device for reporting of a downlink channel quality information using in-band signaling according to some embodiments of the present disclosure.

FIG. 11 is a flowchart of an exemplary process in a wireless device 22 according to some embodiments of the present disclosure. One or more Blocks described herein may be performed by one or more elements of wireless device 22 such as by one or more of processing circuitry 84 (including in-band unit 34), processor 86 and/or radio interface 82. The wireless device 22 such a via processing circuitry 84 and/or processor 86 and/or radio interface 82 is configured to receive (Block S140) downlink control information, DCI, where the DCI is configured to trigger reporting of downlink channel quality information via in-band signaling. The wireless device 22 such a via processing circuitry 84 and/or processor 86 and/or radio interface 82 is configured to transmit (Block S142) the downlink channel quality information associated with the received DCI. In one or more embodiments, the wireless device 22 is in connected mode such as RRC_connected mode.

In one or more embodiments, the reporting of the downlink channel quality information occurs periodically if narrowband physical uplink shared channel, NPUSCH, resources are allocated to the wireless device 22 after the wireless device 22 performs measurements of the downlink channel quality. In one or more embodiments, the reporting of the downlink channel quality information is aperiodic where the aperiodic reporting is triggered based in part on a format of the DCI.

Figure 12:
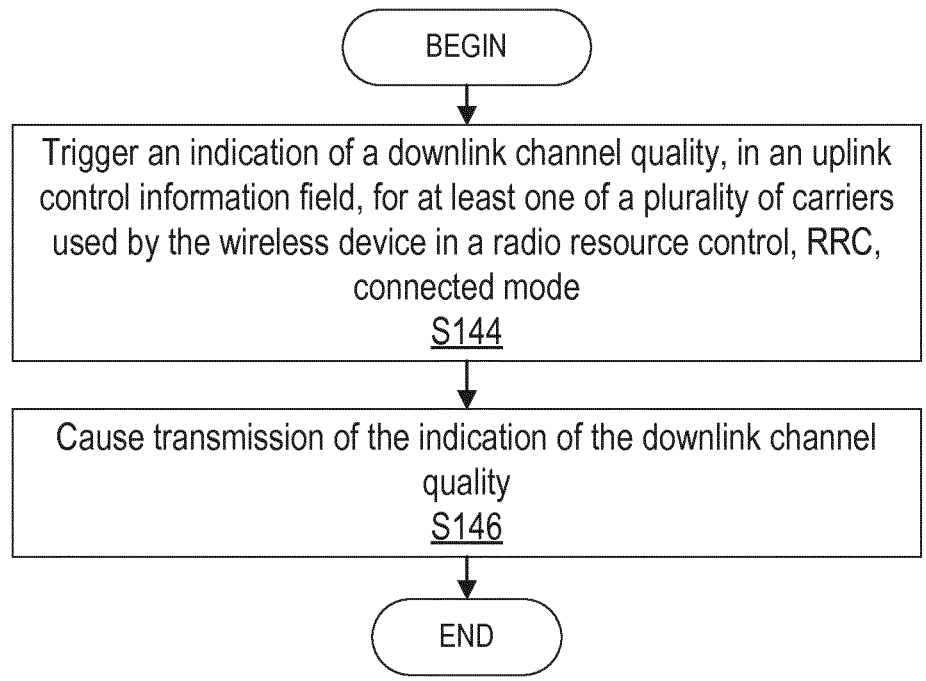
FIG. 12 is a flowchart of an exemplary process in a wireless device according to some embodiments of the present disclosure.

FIG. 12 is a flowchart of an exemplary process in a wireless device 22 according to some embodiments of the present disclosure. One or more Blocks described herein may be performed by one or more elements of wireless device 22 such as by one or more of processing circuitry 84 (including in-band unit 34), processor 86 and/or radio interface 82. The wireless device 22 such a via processing circuitry 84 and/or processor 86 and/or radio interface 82 is configured to trigger (Block S144) an indication of a downlink channel quality, in an uplink control information field, for at least one of a plurality of carriers used by the wireless device 22 in a radio resource control, RRC, connected mode, as described herein. The wireless device 22 such a via processing circuitry 84 and/or processor 86 and/or radio interface 82 is configured to cause (Block S146) transmission of the indication of the downlink channel quality, as described herein.

According to one or more embodiments, the processing circuitry 84 is further configured to receive signaling including control information configured to trigger reporting of the downlink channel quality. According to one or more embodiments, the reporting of the downlink channel quality is comprised in a first Medium Access Control, MAC, control element, CE. According to one or more embodiments, the control information configured to trigger the reporting of the downlink channel quality is comprised in a second Medium Access Control, MAC, control element, CE. According to one or more embodiments, the indication of the downlink channel quality is transmitted using a shared channel that is used for control information and wireless device data.

According to one or more embodiments, the at least one of the plurality of carriers is at least one of a configured carrier and configured set of downlink resources. According to one or more embodiments, the configured carrier is a non-anchor carrier. According to one or more embodiments, the downlink channel quality is reported in a Quality of Service, QoS, Class Identifier, QCI, report. According to one or more embodiments, the signaling including control information configured to trigger the reporting of the downlink channel quality is part of a random access procedure.

According to one or more embodiments, the indication of the downlink channel quality indicates a metric corresponding to downlink decoding performance at the wireless device 22. According to one or more embodiments, the indication of the downlink channel quality indicates a number of repetitions of downlink control channel repetitions. According to one or more embodiments, the signaling is further configured to cause the wireless device to enter the Radio Resource Control, RRC,_Connected state. According to one or more embodiments, the signaling is provided to the wireless device 22 that is in the Radio Resource Control, RRC,_Connected state.

Having generally described arrangements for reporting of a downlink channel quality information using in-band signaling, details for these arrangements, functions and processes are provided as follows, and which may be implemented by the network node 16, wireless device 22 and/or host computer 24.

Embodiments provide reporting of a downlink channel quality information using in-band signaling and are further described below.

Periodic DL Channel Quality Reporting, i.e., Reporting of DL Channel Quality Information In one or more embodiments, the periodic DL channel quality reporting may be enabled at RRC Connection Setup such as part of the RRC configuration in Msg4 of the RRC connection establishment. For periodic DL channel quality reporting, since there is no PUCCH in NB-IoT, it may be difficult to send such periodic reporting in pre-defined UL resources. Therefore, the periodic reporting may only occur if the wireless device 22 is allocated UL resource in NPUSCH.

In one or more embodiments, the wireless device 22 such as for example via processing circuitry 84 and/or processor 86 and/or radio interface 82 measures the DL channel quality and triggers and creates measurement reports periodically, as instructed and/or configured by the network node 16. In one or more embodiments, the reporting is only performed if the wireless device 22 is allocated with at least one UL resource in NPUSCH, e.g., attached as a MAC control element (CE). The wireless device 22 such as for example via processing circuitry 84 and/or processor 86 and/or radio interface 82 may only report the latest DL channel quality to the network node 16 (i.e., newer reports replace older reports in the UL buffer). That is, if there is no UL resource allocated in NPUSCH after the wireless device 22 such as for example via processing circuitry 84 and/or processor 86 and/or radio interface 82 measures the DL channel quality, the wireless device 22 may not request at least one UL resource to send the report. The DL channel quality may become outdated in the beginning of the next measurement occasion. If during the measurement, there is another channel scheduled (transmission/reception) to the wireless device 22, it is up to the wireless device 22 as to which quality reports should be sent.

In one alternative embodiment, the generated reports that have not yet been transmitted (i.e., are in the UL buffer waiting to be transmitted) may be discarded and removed from the buffer after a predefined amount of time (i.e., at or after the expiration of a timer).

In one embodiment, the periodic DL channel quality reporting is multiplexed with user data in the UL when the wireless device 22 is allocated UL resource in NPUSCH.

NB-IoT may support buffer status reporting (BSR) in a periodic resource where the wireless device 22 can report its buffer status. Therefore, in one or more embodiments, the periodic DL channel quality reporting can be multiplexed with the BSR report or alternatively transmitted in the same resource when not used for BSR. In one or more embodiments, the network node 16 such as for example via processing circuitry 68 and/or processor 70 and/or radio interface 62 and/or communication interface 60 can assign the UL resource for the wireless device 22 for reporting the periodic DL channel quality. In one or more embodiments, the UL resources are configured for "transmission in pre-configured resources" (as defined in 3GPP Rel-16) may be used to carry the measurement report.

In one or more embodiments, the wireless device 22 in Msg3 (such as for EDT Msg3) can report a list of DL channel quality for a number of carriers (anchor and/or non-anchors) such as for example via processing circuitry 84 and/or processor 86 and/or radio interface 82. The network node 16 such as for example via processing circuitry 68 and/or processor 70 and/or radio interface 62 and/or communication interface 60 can specify a bit pattern or integer value for each carrier in the DCI. Further, the integer value absolute radio frequency channel number (ARFCN) may be provided by the network (NW) or network node 16 in a system information broadcast (SIB). This can be extended to include an indication of which carrier the network node 16 expects the wireless device 22 to provide the report, for instance, using an electronic flag. The wireless device 22 such as for example via processing circuitry 84 and/or processor 86 and/or radio interface 82 may report the DL channel quality report and indicate to which carrier the DL channel report corresponds to as per the bit pattern or integer value or as per the flag set in the system info broadcast (SIB). The bit pattern or integer value in the UL (in Msg3) may also be the carrier ARFCN value or some abbreviated notation. The reporting can be periodic and/or aperiodic.

Aperiodic DL Channel Quality Reporting

In one or more embodiments, the aperiodic DL channel quality reporting may be enabled at RRC Connection Setup. For example, as part of the RRC configuration in Msg4 of the RRC connection establishment, or EDT procedure (as described below).

The content of DCI format N0 and N1 are shown in Table 3 and Table 4. The DCI1 format N0 is used for UL scheduling, and DCI format N1 is used for DL scheduling or NPDCCH ordered PRACH procedures.

TABLE 3

DCI format N0 used for scheduling NPUSCH Format 1

| Information | Size [bits] | Possible Settings |
| --- | --- | --- |
| Flag for format N0/N1 | 1 | DCI N0 or DCI N1 |
| Subcarrier indication | 6 | Allocation based on subcarrier index 3.75 kHz spacing: {0}, {1}, . . . , or {47} 15 KHz spacing: 1-tone allocation: {0}, {1}, . . . , or {11} 3-tone allocation: {0, 1, 2}, {3, 4, 5}, {6, 7, 8}, {9, 10, 11} 6-tone allocation: {0, 1, . . . , 5} or {6, 7, . . . , 11} 12-tone allocation: {0, 1, . . . , 11} |

TABLE 3-continued

DCI format N0 used for scheduling NPUSCH Format 1

| Information | Size [bits] | Possible Settings |
|---|---|---|
| NPUSCH scheduling delay | 2 | 8, 16, 32, or 64 |
| DCI subframe repetition number | 2 | Depending on Rmax, either 1, 2, 4, or Rmax/8, Rmax/4, Rmax/2, Rmax |
| Number of RUs | 3 | 1, 2, 3, 4, 5, 6, 8, or 10 |
| Number of NPUSCH repetition | 3 | 1, 2, 4, 8, 16, 32, 64, or 128 |
| MCS | 4 | 0, 1, . . . , or 13, for indexing the row of the NPUSCH TBS table |
| Redundancy version | 1 | Redundancy version 0 or 2 |
| New data indicator (NDI) | 1 | NDI toggles for new TB or does not toggle for the same TB |
| HARQ process number | 1 | 0, 1, only present when two HARQ processes are configured |

TABLE 4

DCI Format N1 used for scheduling NPDSCH

| Information | Size [bits] | Possible Settings |
|---|---|---|
| Flag for format N0/N1 | 1 | DCI N0 or DCI N1 |
| NPDCCH order indication | 1 | Whether the DCI is used for NPDSCH scheduling or for NPDCCH order |
| Additional time offset for NPDSCH (in addition to a minimal 4-ms gap) | 3 | Rmax <128: 0, 4, 8, 12, 16, 32, 64, or 128 (ms) Rmax >=128: 0, 16, 32, 64, 128, 256, 512, or 1024 (ms) |
| DCI subframe repetition number | 2 | Depending on Rmax, either 1, 2, 4, or Rmax/8, Rmax/4, Rmax/2, Rmax |
| Number of NPDSCH subframes per repetition | 3 | 1, 2, 3, 4, 5, 6, 8, or 10 |
| Number of NPDSCH repetition | 4 | 1,2, 4, 8, 16, 32, 64, 128, 192, 256, 384, 512, 768, 1024, 1536, or 2048 |
| MCS | 4 | 0, 1, . . . , or 13, for indexing the row of the NPDSCH TBS table |
| NDI | 1 | NDI toggles for new TB or does not toggle for the same TB |
| HARQ-ACK resource | 4 | 15 kHz subcarrier spacing: Time offset value: 13, 15, 17, or 18 Subcarrier index: 0, 1, 2, or 3 3.75 kHz subcarrier spacing: Time offset value: 13 or 17 Subcarrier index: 38, 39, 40, 41, 42, 43, 44, or 45 |
| HARQ process number | 1 | 0, 1, only present when two HARQ processes are configured |

In one or more embodiments, a new field is introduced in DCI format N0 for the network node 16 such as for example via processing circuitry 68 and/or processor 70 and/or radio interface 62 and/or communication interface 60 to indicate whether the wireless device 22 should report its DL quality in the assigned NPUSCH resources (possibly together with other wireless device 22 data if the wireless device 22's buffer is not empty). When the aperiodic DCI reporting is enabled, the wireless device 22 may only monitor this new DCI format, and DCI format N1 may be padded to the same size as DCI format N0, e.g., bits may be added to DCI format N1 such as 0 bits/zero padding. So, the wireless device 22 may not need to monitor two different DCI sizes.

In one or more embodiments, an RNTI is introduced to scramble the DCI format N0 in order for the network node 16 such as for example via processing circuitry 68 and/or processor 70 and/or radio interface 62 and/or communication interface 60 to indicate whether the wireless device 22 is to report its DL channel quality in the assigned NPUSCH resources (possibly together with other wireless device 22 data if the wireless device 22's buffer is not empty). When the aperiodic DCI reporting is enabled, the wireless device 22 such as for example via processing circuitry 84 and/or processor 86 and/or radio interface 82 may need to monitor two RNTIs but this may not increase the wireless device 22 complexity as existing NB-IoT wireless devices 22 are capable of monitoring two RNTIs during RRC setup. In this way, the DCI sizes are not changed, so no bit padding is needed for DCI format N1.

In one or more embodiments, the DCI format N1 can be used for the network node 16 such as for example via processing circuitry 68 and/or processor 70 and/or radio interface 62 and/or communication interface 60 to indicate whether the wireless device 22 should report its DL quality in the assigned NPUSCH resources. When the DCI format N1 is used for NPDCCH that is commanded by NPRACH, there are several reserved bits. As a non-limiting example, 3GPP Technical Specification (TS) 36.212 provides:

Format N1 is used for a random access procedure initiated by a NPDCCH order/command only if the NPDCCH order indicator is set to '1', format N1 cyclic redundancy check (CRC) is scrambled with a cell radio network temporary identifier (C-RNTI), and all the remaining fields may be set as follows:

Starting number of NPRACH repetitions—2 bits as defined in section 16.3.2 of 3GPP technical specification group (TSG)-RAN WG1 Meeting #94bis, for example;

Subcarrier indication of NPRACH—6 bits as defined in section 16.3.2 of 3GPP TSG-RAN WG1 Meeting #94bis, for example;

Carrier indication of NPRACH—4 bits as defined in section 16.3.2 of 3GPP TSG-RAN WG1 Meeting #94bis, for example. This field may only be present if nprach-MultiCarrierConfig is configured and the wireless device 22 indicates the multiCarrier-NPRACH capability;

All the remaining bits in format N1 are set to "1".

Therefore, one of the reserved bits may be used to indicate that the DCI is used to request that the wireless device 22 such as for example via processing circuitry 84 and/or processor 86 and/or radio interface 82 reports the DL channel quality. With the presence of this field, the rests of the bits can be reinterpreted. Depending on whether two HARQ processes are configured or not, up to 21 bits may be used to indicate the UL resource allocation. For example, the size of the subcarrier may be indicated or may indicate, and the NPUSCH scheduling delay fields can be reduced.

In one or more embodiments, MAC control elements (CE) are introduced for both the network node 16 for triggering reporting of downlink channel quality information, for example requesting an aperiodic report such as a QoS class identifier (QCI) report, and for the wireless device 16 to include the indication of the downlink channel quality, for example a report such as the QCI report. The MAC CE may be part of control information such as downlink control information. In an example where QCI reporting is applied in RRC_CONNECTED state, and occurs when the wireless device 22, during connection setup, is configured to another DL non-anchor carrier in Msg4. The wireless device 22 is requested, either by including the above described CE in Msg4 or Msg6, to provide a QCI report on the DL non-anchor carrier. The wireless device 22 has been configured to include the abovementioned CE in Msg7 or a later message (note that the QCI report may require that the wireless device 22 has received signaling and/or information on the configured DL non-anchor carrier). In one or more embodiments, Msg 6 may be a continuation of a transfer session.

In 3GPP Rel 15 describing Early Data Transmission (EDT), user-plane data can be transmitted in Msg3 in the UL, and/or in Msg4 in the DL. Since, for mobile originated EDT, the EDT selects a preamble for Msg1 transmission from a specific EDT NPRACH partition, the QCI report can be included in Msg3 (for which the UL grant is larger with the use of EDT), either when indicated in Msg2 (i.e., in the EDT RAR), indicated in system information broadcast, or hard coded as per examples in the 3GPP specification. It may be up to the network node 16 such as for example via processing circuitry 68 and/or processor 70 and/or radio interface 62 and/or communication interface 60 to, via Msg4, transition the wireless device 22 back to RRC_IDLE (i.e., no more data to transmit) or keep the wireless device 22 in RRC_CONNECTED (i.e., more DL data pending). In the former case, the report may only be beneficial for the Msg4 transmission. In the latter case, the report and any further reports may be beneficial for the remainder of the connected session. In an alternative embodiment, the network node 16 such as for example via processing circuitry 68 and/or processor 70 and/or radio interface 62 and/or communication interface 60 may request the report in Msg4, i.e., after the network node 16, in Msg3, has identified the wireless device 22 and decided to keep the wireless device 22 in RRC_CONNECTED (i.e., connected mode) after Msg4. The wireless device 22 such as for example via processing circuitry 84 and/or processor 86 and/or radio interface 82 may then provide the report in Msg5. (This case could potentially be provided by the above generic MAC CE, if the EDT RRC messages and signaling procedure allows for the addition of this CE).

In one or more embodiments, the indication of a downlink channel quality, for example an aperiodic report of DL channel quality, is triggered and generated by any combination of the following:
  A change in the wireless devices 22 coverage, e.g., measured by a change in RSRP/RSRQ;
  A change in TBS and hence the number of repetitions to be applied;
  The expiration of a timer (i.e., transforming the report into a periodic report); and/or
  During a time window, the wireless device 22 determines that the scheduled number of repetitions by the network node 16 is (significantly) larger than what it needs to decode the corresponding channel correctly.

Wireless Device 22 Report Format and Content

In the above "Periodic DL channel quality reporting" and "Aperiodic DL channel quality reporting" sections, the DL channel quality reported by the wireless device 22 may be a metric that the network node 16 can use to derive the current DL decoding performance at the wireless device 22. Therefore, the DL channel quality report can be but is not limited to a (hypothetical) number of repetitions of various DL channels, e.g., NPDCCH, NPDSCH, with a targeted block error rate (BLER), or a (quantified) metric that reflects the signal strength, e.g., (modified/adjusted) SNR, SINR, NRSRP, NRSRQ, the actual number of repetitions that may be required for wireless devices 22 to decode NPDCCH or NPDSCH, or a preferred MCS scheme by the wireless device 22 which fulfils a targeted BLER. The DL quality can be measured on a specific set of DL resources configured by the network node 16 such as for example via processing circuitry 68 and/or processor 70 and/or radio interface 62 and/or communication interface 60, or as may be specified in the 3GPP standard.

Wireless Device 22 Reporting on the Paging Carrier

Monitoring of paging is supported on non-anchor carriers. In one embodiment, a measurement report is triggered and generated based on the NPDCCH (or paging message on NPDSCH) transmission on the paging carrier. In one example, the wireless device 22 such as for example via processing circuitry 84 and/or processor 86 and/or radio interface 82 reports the QCI or CQI on the paging carrier in the subsequent connection attempt if paged. Note that in this case, the wireless device 22 could include two QCI or CQI reports, one for the paging carrier and one for the DL carrier where RAR (Msg2) is received (and potentially yet another QCI or CQI report later in time on the DL carrier to which the wireless device 22 is configured in Msg4).

In an alternative embodiment, the paging QCI or CQI reports are triggered and generated also when the wireless device 22 is not paged itself. That is, based on the common NPDCCH scrambled with paging-radio network temporary identifier (P-RNTI), or the common NPSCH carrying the paging message, and also when the paging message does not contain a paging record with the wireless devices_ID. Unlike the previous embodiment, the paging QCI or CQI report would then be buffered in the wireless device 22 and transmitted later in a subsequent UL transmission.

The Wireless Device 22 Reporting on an Anchor Carrier

In one or more embodiments, the wireless device 22 such as for example via processing circuitry 84 and/or processor 86 and/or radio interface 82 builds and/or generates a measurement report based on the reception of the broadcasted Master Information (MIB) and System information blocks (SIB) on the anchor carrier. The report is sent by the wireless device 22 such as for example via processing circuitry 84 and/or processor 86 and/or radio interface 82 to the network/network node 16 if the wireless device 22 enters a connected mode. The report may contain metrics related to the decoding of each of the MIB and SIBs, such as time or number of repetitions until successful acquisition.

This information may allow the network/network node 16 to optimize the scheduling of the MIB, SIBs and the configuration of the anchor carrier carrying these messages.

SOME EXAMPLES

Example A1. A network node 16 configured to communicate with a wireless device 22, the network node 16 configured to, and/or comprising a radio interface 62 and/or comprising processing circuitry 68 configured to:
  transmit downlink control information, DCI, to the wireless device 22, the DCI configured to trigger reporting of downlink channel quality information via in-band signaling; and
  receive the downlink channel quality information associated with the transmitted DCI.

Example A2. The network node 16 of Example A1, wherein the reporting of the downlink channel quality information occurs periodically if narrowband physical uplink shared channel, NPUSCH, resources are allocated to the wireless device 22 after the wireless device 22 performs measurements of the downlink channel quality.

Example A3. The network node 16 of Example A1, wherein the reporting of the downlink channel quality information is aperiodic, the aperiodic reporting being triggered based in part on a format of the DCI.

Example B1. A method implemented in a network node 16, the method comprising:
- transmitting downlink control information, DCI, to a wireless device 22, the DCI configured to trigger reporting of downlink channel quality information via in-band signaling; and
- receiving the downlink channel quality information associated with the transmitted DCI.

Example B2. The method of Example B1, wherein the reporting of the downlink channel quality information occurs periodically if narrowband physical uplink shared channel, NPUSCH, resources are allocated to the wireless device 22 after the wireless device 22 performs measurements of the downlink channel quality.

Example B3. The method of Example B1, wherein the reporting of the downlink channel quality information is aperiodic, the aperiodic reporting being triggered based in part on a format of the DCI.

Example C1. A wireless device 22 configured to communicate with a network node 16, the wireless device 22 configured to, and/or comprising a radio interface 82 and/or processing circuitry 84 configured to:
- receive downlink control information, DCI, the DCI configured to trigger reporting of downlink channel quality information via in-band signaling; and
- transmit the downlink channel quality information associated with the received DCI.

Example C2. The wireless device 22 of Example C1, wherein the reporting of the downlink channel quality information occurs periodically if narrowband physical uplink shared channel, NPUSCH, resources are allocated to the wireless device 22 after the wireless device performs measurements of the downlink channel quality.

Example C3. The wireless device of Example C1, wherein the reporting of the downlink channel quality information is aperiodic, the aperiodic reporting being triggered based in part on a format of the DCI.

Example D1. A method implemented in a wireless device 22, the method comprising:
- receiving downlink control information, DCI, the DCI configured to trigger reporting of downlink channel quality information via in-band signaling; and
- transmitting the downlink channel quality information associated with the received DCI.

Example D2. The method of Example D1, wherein the reporting of the downlink channel quality information occurs periodically if narrowband physical uplink shared channel, NPUSCH, resources are allocated to the wireless device 22 after the wireless device 22 performs measurements of the downlink channel quality.

Example D3. The method of Example D1, wherein the reporting of the downlink channel quality information is aperiodic, the aperiodic reporting being triggered based in part on a format of the DCI.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may, in fact, be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device in a communication system, the communication system comprising narrowband multi-carrier operation, the network node comprising processing circuitry configured to:
    cause transmission of a Medium Access Control, MAC, control element, CE including control information configured to trigger reporting of a downlink channel quality of one of a plurality of carriers, the MAC CE assigning the one of the plurality of carriers to the wireless device and causing the wireless device to enter radio resource control, RRC, connected mode; and
    receive in an uplink control information field of a MAC CE an indication of the downlink channel quality for the one of the plurality of carriers assigned to the wireless device.

2. The network node of claim 1, wherein the at least one of the plurality of carriers is one of a configured carrier and configured set of downlink resources.

3. The network node of claim 1, wherein the assigned one of the plurality of carriers is a non-anchor carrier.

4. The network node of claim 1, wherein the downlink channel quality is reported in a Quality of Service, QoS, Class Identifier, QCI, report.

5. The network node of claim 1, wherein signaling including control information configured to trigger the reporting of the downlink channel quality is part of a random access procedure.

6. The network node of claim 5, wherein the transmitted MAC CE is a msg4 and the received MAC CE is a msg5.

7. The network node of claim 1, wherein the indication of the downlink channel quality indicates a number of repetitions of downlink control channel repetitions.

8. A wireless device configured to communicate with a network node in a communication system, the communication system comprising narrowband multi-carrier operation, the wireless device comprising processing circuitry configured to:
    receive a Medium Access Control, MAC, control element, CE signaling configured to assign one of a plurality of carriers to the wireless device and cause the wireless device to enter a connected mode, the MAC CE including control information configured to trigger reporting of a downlink channel quality of the assigned one of the plurality of carriers; and
    trigger the transmission of an indication of the downlink channel quality, in an uplink control information field of a MAC CE, of the assigned one of the plurality of carriers to the wireless device.

9. The wireless device of claim 8, wherein the at least one of the plurality of carriers is one of a configured carrier and a configured set of downlink resources.

10. The wireless device of claim 9, wherein the assigned one of the plurality of carriers is a non-anchor carrier.

11. The wireless device of claim 8, wherein the downlink channel quality is reported in a Quality of Service, QoS, Class Identifier, QCI, report.

12. The wireless device of claim 8, wherein signaling including control information configured to trigger the reporting of the downlink channel quality is part of a random access procedure.

13. The wireless device of claim 12, wherein the received MAC CE is a msg4 and the transmitted MAC CE is a msg5.

14. The wireless device of claim 12, wherein user-plane data is at least one of transmitted in a msg3 and received in a msg4.

15. The wireless device of claim 8, wherein the indication of the downlink channel quality indicates a number of repetitions of downlink control channel repetitions.

16. A method implemented by a network node configured to communicate with a wireless device in a communication system, the method comprising:
    transmitting a Medium Access Control, MAC, control element, CE including control information configured to trigger reporting of a downlink channel quality of one of a plurality of carriers, the MAC CE assigning the one of the plurality of carriers to the wireless device and causing the wireless device to enter radio resource control, RRC, connected mode; and
    receiving in an uplink control information field of a MAC CE, an indication of the downlink channel quality of the one of the plurality of carriers assigned to the wireless device.

17. The method of claim 16, wherein signaling including control information configured to trigger the reporting of the downlink channel quality is part of a random access procedure wherein the transmitted MAC CE is a msg4 and the received MAC CE is a msg5 and wherein user-plane data is at least one of received in a msg3 and transmitted in the msg4.

18. A method implemented by a wireless device configured to communicate with a network node in a communication system, the communication system comprising narrowband multi-carrier operation, the method comprising:
    receiving a Medium Access Control, MAC, control element, CE configured to assign one of a plurality of carriers to the wireless device and cause the wireless device to enter a connected mode, the MAC CE including control information configured to trigger reporting of a downlink channel quality of the assigned one of the plurality of carriers;
    triggering transmitting an indication of the downlink channel quality, in an uplink control information field of a MAC CE, of the one of the plurality of carriers assigned to the wireless device.

19. The method of claim 18, wherein at least one of the plurality of carriers is one of a configured carrier and a configured set of downlink resources and wherein the assigned one of the plurality of carriers is a non-anchor carrier.

20. The method of claim 18, wherein signaling including control information configured to trigger the reporting of the downlink channel quality is part of a random access procedure wherein the received MAC CE is a msg4 and the transmitted MAC CE is a msg5 and wherein user-plane data is at least one of transmitted in a msg3 and received in the msg4.

* * * * *